United States Patent
Brocko et al.

(10) Patent No.: US 6,764,006 B1
(45) Date of Patent: Jul. 20, 2004

(54) APPARATUS AND/OR METHOD TO REDUCE BIAS CURRENT FOR MR READER DURING READ ONLY OPERATION

(75) Inventors: Robert G. Brocko, Boulder, CO (US); Keith G. Boyer, Broomfield, CO (US); James C. Cates, Superior, CO (US); Larry D. Blanchard, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 8 days.

(21) Appl. No.: 10/208,406

(22) Filed: Jul. 30, 2002

(51) Int. Cl.[7] ................................................ G06K 7/08
(52) U.S. Cl. ...................................................... 235/449
(58) Field of Search ......................................... 235/449

(56) References Cited

U.S. PATENT DOCUMENTS

| | | |
|---|---|---|
| 5,412,518 A | 5/1995 | Christner et al. |
| 5,790,334 A | 8/1998 | Cunningham |
| 6,414,811 B1 | 7/2002 | Lee |
| 6,452,735 B1 * | 9/2002 | Egan et al. ................... 360/31 |

OTHER PUBLICATIONS

Zhang Shuyu, et al., Variation Of The Heat Flux Between A Slider And Air Bearing When The Slider Files Over An Asperity, IEEE Transactions On Magnetics, Jul. 1998, pps. 1705–1707, vol. 34, No. 4.

Tian, Hong, et al., Non–Contact Induced Thermal Disturbance of MR Head Signals, IEEE Transactions On Magnetics, Sep. 1997, pps. 3130–3132, vol. 33, No. 5.

Dee, R.H., et al., Thermal Effects In Shielded MR Heads For Tape Applications, IEEE Transactions On Magnetics, Nov. 1991, pps. 4704–4733, vol. 27, No. 6.

* cited by examiner

*Primary Examiner*—Mark Tremblay
(74) *Attorney, Agent, or Firm*—Brooks Kushman PC

(57) ABSTRACT

An apparatus includes a tape read head bias signal control circuit configured to present to a tape read head a first amplitude bias signal in response to at least a first control signal and a second amplitude bias signal in response to at least a second control signal, wherein the second amplitude is lower than the first amplitude. The read head, thereby, may have a reduced operating temperature.

33 Claims, 1 Drawing Sheet

APPARATUS AND/OR METHOD TO REDUCE BIAS CURRENT FOR MR READER DURING READ ONLY OPERATION

BACKGROUND OF THE INVENTION

1. Field of the Invention

The present invention relates to tape readers generally and, more particularly, to a bias current change for a MR reader during a read only operation.

2. Background Art

In a tape environment, a tape reader is required to have sufficient amplitude to overcome the inherent noise present in the tape drive. Write-to-read signal feedthrough is one of the largest noise sources in the system. The write-to-read signal feedthrough noise is present during a write operation when a read verify operation is occurring simultaneously with the write operation. The write-to-read signal feedthrough noise is not present during a read only operation.

The ongoing push to implement larger tape cartridge capacities has resulted in higher recording densities and decreased read track widths. The combination of higher recording densities and decreased read track widths causes a decrease in reader signal amplitude. Implementation of more sensitive magnetoresistive (MR) readers can partially improve the reader signal amplitude. However, a negative result of the more sensitive MR readers is that the higher sensitivity MR readers tend to operate at higher read head element temperatures since the higher sensitivity is typically implemented in connection with an increased read head bias current density.

In soft adjacent layer (SAL) biased MR read heads, the readback (or read) signal amplitude increases with increased bias current. However, Joule heating of the MR read head element causes the MR read head temperature to increase with the increased bias current. Other performance parameters such as amplitude symmetry tend to be insensitive to the bias current when the SAL film is saturated.

MR disk heads are known to exhibit a read signal fluctuation due to cooling of the MR reader when the MR head comes in close proximity to the disk (see, for example, H. Tiam, C-Y. Cheung and P-K. Wang, "Non-Contact Induced Thermal Disturbance of MR Head Signals", *IEEE Trans. Magn.*, Vol. 33, No. 5, pp. 3130–3132, 1997 and S. Zhang and D. Bogy, "Variations of the Heat Flux Between a Slider and Air Bearing when the Slider Flies Over an Asperity", *IEEE Trans. Magn.*, Vol. 34, No. 4, pp. 1705–1707, 1998, which are hereby incorporated by reference in their entirety). MR tape read heads exhibit a similar read signal fluctuation phenomenon when the tape comes in closer contact with the MR read head (see, for example, R. H. Dee and R. F. M. Thornley, "Thermal Effects in MR Heads for Tape Applications", *IEEE Trans. Magn.*, Vol. 27, No. 6, pp. 4704–4707, 1991, which is hereby incorporated by reference in its entirety). The read signal fluctuation often causes errors in the read channel signal. The read signal fluctuation is made worse when the MR read head element temperature is higher. In addition, elevated temperatures can reduce MR read head element lifespan.

A conventional tape drive can experience reading blocks in error due to the cooling effect. MR heads that operate at higher temperatures due to process variation during head manufacturing are more prone to reading blocks in error due to the cooling effect. In some conventional tape drives, the read signal fluctuations increase the block error rate and lead to reduced system margins. The read signal fluctuation due to elevated temperatures can be particularly problematic when reading legacy tapes where the system margin has been reduced due to system constraints.

Thus, there exists a need for an apparatus and/or a method for reducing the temperature of the read head element. The reduced temperature read head may be advantageously implemented in MR head applications. The reduced temperature read head may reduce block error rates. The reduced temperature read head may improve system margins. The reduced temperature read head may provide improved MR read head lifespan. The reduced temperature read head may be advantageously implemented during read only operations. The read only operations where the reduced temperature read head may be implemented may include legacy read operations, normal (i.e., standard, non-legacy) read operations, and/or error recovery procedures or operations.

SUMMARY OF THE INVENTION

Accordingly, the present invention provides an improved apparatus and/or method for reducing tape read head temperature where the bias current that is presented to the read head is at a lower amplitude during at least one mode of operation (e.g., at least one read only mode) than during at least one other mode of operation (e.g., a write/read mode), thereby reducing block error rates.

According to the present invention, an apparatus is provided comprising a tape read head bias signal control circuit configured to present to a tape read head a first amplitude bias signal in response to at least a first control signal and a second amplitude bias signal in response to at least a second control signal. The second amplitude is lower than the first amplitude.

Also according to the present invention, a method for reducing a tape read head temperature is provided comprising presenting a first amplitude bias signal to a tape read head during at least a first mode of operation and presenting a second amplitude bias signal to the read head during at least a second mode of operation. The second amplitude is lower than the first amplitude.

Further, according to the present invention, an apparatus is provided comprising a tape read head and a tape read head bias signal control circuit. The tape read head bias signal control circuit may be configured to present a first amplitude bias signal in response to at least a first control signal and a second amplitude bias signal in response to at least a second control signal to the tape read head. The second amplitude is lower than the first amplitude.

Also according to the present invention, a method for reducing a tape read head temperature is provided comprising providing a tape read head bias signal control circuit configured to present to a tape read head a first amplitude bias signal in response to at least a first control signal and a second amplitude bias signal in response to at least a second control signal. The second amplitude is lower than the first amplitude.

Still further according to the present invention, an apparatus is provided having a reduced tape read head temperature. The apparatus includes means for presenting a first amplitude bias signal to a tape read head during at least a first mode of operation and means for presenting a second amplitude bias signal to the read head during at least a second mode of operation. The second amplitude is lower than the first amplitude.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an apparatus and/or a method for reducing a magnetoresistive (MR) reader head bias current signal amplitude during at least one mode of operation (e.g., at least one read only mode) when compared to the amplitude of the reader head bias current signal during at least one other mode of operation (e.g., a write/read mode). During a write/read operation, the bias current signal is generally maintained at a level (or amplitude) that may ensure adequate signal amplitude to overcome feedthrough noise (i.e., maintain an adequate signal-to-noise ratio).

The bias current change (i.e., reduction) may be implemented via available circuitry on a read/write channel card. However, the tape read head bias signals may be generated and presented via any appropriate circuitry to meet the design criteria of a particular application. The bias current reduction of the present invention may provide reduced tape head operating temperature. The bias current reduction of the present invention may provide an improved MR tape head lifespan. The bias current reduction of the present invention may provide reduced block error rate. The bias current reduction of the present invention may provide improved system margins.

In one example MR tape-head element, a write/read bias current generally has a nominal value of 10 mA. The present invention may provide for the reduction of a read bias current to approximately 8 mA when performing a read only operation such as reading legacy tapes (i.e., when writer elements are turned off). Since power (and the heat generated therefrom) is generally proportional to the square of the current, the reduction of 10 mA to 8 mA generally results in a power reduction of nearly 40%. The power reduction provided by the present invention generally provides a substantial reduction in read head element temperature. The present invention may provide a significant improvement in read performance. In one example, the present invention may be implemented in connection with a legacy read operation. In another example, the present invention may be implemented in connection with a normal (non-legacy) standard procedure read operation. In yet another example, the present invention may be implemented in connection with an error recovery procedure. However, the present invention may be implemented in connection with any appropriate read only procedure to meet the design criteria of a particular application.

Figure 1:
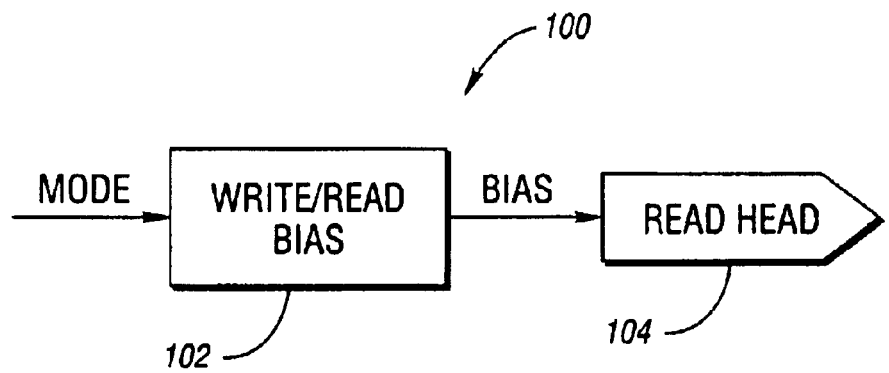
FIG. 1 is a diagram of a read head circuit according to a preferred embodiment of the present invention.

Referring to FIG. 1, a diagram of a circuit 100 in accordance with a preferred embodiment of the present invention is shown. The circuit 100 may be implemented as a portion (or section) of a tape write/read apparatus (or system, not shown). The circuit 100 generally comprises a write/read bias signal generation circuit 102 and a tape read head (or tape read head element) 104. The write/read bias signal generation circuit 102 may be implemented similar to existing (available) circuitry. The read head 104 may be implemented as an MR read head.

The write/read bias signal generation circuit 102 may have an input that may receive a control signal (e.g, MODE) and an output that may present a bias signal (e.g., BIAS). The signal MODE may be implemented as a bias level (amplitude, value, etc.) control signal. The signal MODE may have a number of values that correspond to modes of operation of the system where the circuit 100 is implemented. The signal BIAS may be implemented as a read bias current signal.

The read head 104 may have an input that may receive the signal BIAS. The circuit 102 may be configured to generate (and present) the signal BIAS at a number of levels (i.e., amplitudes, values, etc.) in response to respective values (i.e., states, conditions, etc.) of the signal MODE as described below in connection with FIG. 2.

Figure 2:
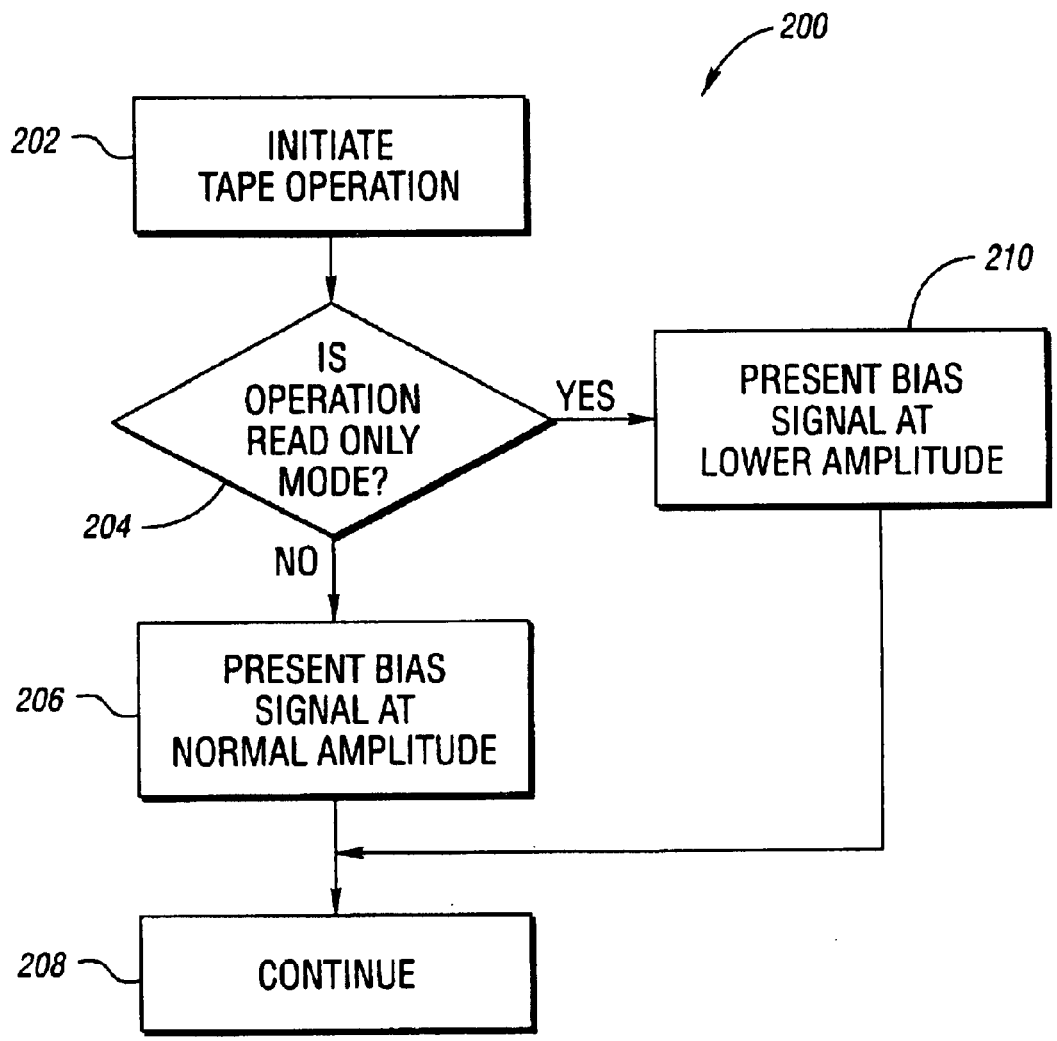
FIG. 2 is a flow chart of an operation according to a preferred embodiment of the present invention.

Referring to FIG. 2, a flow chart of an operation 200 according to a preferred embodiment of the present invention is shown. The operation (method, procedure, process, mode of operation, steps, states, etc.) 200 may be implemented as a bias signal control method. The method 200 may control the level of an MR read head bias current signal. The method 200 is generally implemented in connection with a read head bias current signal control circuit and tape read head such as the circuit 102 and the head 104, respectively, of the circuit 100.

The operation 200 generally comprises a state (or block) 202, a decision state (or block) 204, a state (or block) 206, a state (or block) 208), and a state (or block) 210. During the state 202, the method 200 generally initiates a tape operation. The tape operation may be any appropriate tape operation (e.g., a write/read mode, a read only mode, a legacy, read only mode, a standard read only mode, a test mode, an error recovery mode, etc.). The method 200 generally continues to the decision state 204.

During the decision state 204 the method 200 may determine whether or not the tape operation is a read only mode of operation. When the tape operation is a mode other than a read only operation (e.g., a write/read mode) as indicated by a corresponding (or respective) value of the signal MODE, the method 200 generally continues to the state 206.

During the state 206, the circuit where the method 200 is implemented (e.g., the bias control circuit 102) generally presents the tape head read bias control signal BIAS at a normal (or nominal) level. The normal level of the signal BIAS may be generated (or selected) to provide an adequate amplitude (or value) to the read head bias current to overcome (i.e., prevent or minimize impact of) write-to-read signal feedthrough noise during a write/read operation. However, the normal level of the signal BIAS may be selected (and presented) as any appropriate value to meet the design criteria of a particular application. The method 200 generally continues to the state 208. The state 208 is generally a continuation state where the method 200 proceeds to perform succeeding states (or steps) in the tape operation.

Returning to the decision state 204, when the tape operation is a read only mode of operation as indicated by a corresponding (or respective) value of the signal MODE, the method 200 generally continues to the state 210. In one example, the method 200 may proceed to the state 210 when the tape operation is a legacy read only mode of operation. In another example, the method 200 may proceed to the state 210 when the tape operation is a normal (i.e., standard or non-legacy) read only operation. In yet another example, the method 200 may proceed to the state 210 when the tape operation is an error recovery read only operation. However, the method 200 may continue to the state 210 in response to any appropriate read only operation to meet the design criteria of a particular application.

During the state 210, the circuit (or system) where the method 200 is implemented (e.g., the bias control circuit 102) generally presents the tape head read bias control signal BIAS at a changed (i.e., reduced, lowered, etc.) level when compared to the normal (or nominal) level. The lower level of the signal BIAS may be generated (or selected) to provide an amplitude (or value) to the read head bias current that generally provides a reduced (or lower) temperature of the read head in the circuit where the method 200 is implemented (e.g., the tape head 104).

In a preferred embodiment of the present invention, the read only amplitude of the signal BIAS may be in a range of 70% to 90% of the non-read only amplitude of the signal BIAS. In a more preferred embodiment, the read only amplitude of the signal BIAS may be in a range of 75% to 85% of the non-read only amplitude of the signal BIAS. In one example, the read only (i.e., lower or reduced) amplitude of the signal BIAS may be approximately 80% of the value of the nominal (i.e., non-read only) amplitude of the signal BIAS. Such a reduction in MR read head bias current may result in a nearly 40% reduction in power at the read head and a significant (or substantial) reduction in read head temperature. However, the lower (i.e., read only mode) level of the signal BIAS may be selected (and presented) as any appropriate value to meet the design criteria of a particular application.

As is readily apparent from the foregoing description, then, the present invention generally provides an improved apparatus (e.g., the circuit 100) and/or a method (e.g., the method 200) for reducing an MR reader head bias current signal (e.g., the signal BIAS) amplitude during at least one read only mode of operation when compared to the amplitude of the reader head bias current signal during at least one other mode of operation (e.g., a write/read mode). In doing so, the present invention thereby enhances device and/or system performance, including reduction of read head temperature, increased head life, reduction of block error rates, and/or improved system margins.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus comprising:
   a tape read head bias signal control circuit configured to present to a tape read head a first amplitude bias signal in response to at least a first control signal and a second amplitude bias signal in response to at least a second control signal, wherein the second amplitude is lower than the first amplitude, and the amplitude of the first bias signal is selected to lessen impact of noise on a read signal during a write/read operation.

2. The apparatus of claim 1 wherein the second amplitude bias signal is configured to reduce an operating temperature of the read head.

3. The apparatus of claim 1 wherein the second amplitude bias signal is configured to increase lifespan of the read head.

4. The apparatus of claim 1 wherein the apparatus is configured to have reduced block error rates in response to the second amplitude bias signal.

5. The apparatus of claim 1 wherein the read head comprises a magnetoresistive (MR) read head.

6. The apparatus of claim 1 wherein the first and second amplitude bias signals comprise current signals.

7. The apparatus of claim 1 wherein the second amplitude is in a range of 70% to 90% of the first amplitude.

8. The apparatus of claim 1 wherein the second amplitude is in a range of 75% to 85% of the first amplitude.

9. The apparatus of claim 1 wherein the second amplitude is approximately 80% of the first amplitude.

10. The apparatus of claim 1 wherein the first control signal is presented in response to a mode of operation other than a read only mode.

11. The apparatus of claim 1 wherein the first control signal is presented in response to a write/read mode of operation.

12. The apparatus of claim 1 wherein the second control signal is presented in response to at least one read only mode of operation.

13. The apparatus of claim 1 wherein the second control signal is presented in response to an earlier generation drive read only mode of operation.

14. The apparatus of claim 1 wherein the second control signal is presented in response to a normal, current generation drive read only mode.

15. The apparatus of claim 1 wherein the second control signal is presented in response to an error recovery read only mode of operation.

16. The apparatus of claim 1 wherein the first amplitude bias signal is selected to lessen impact of write-to-read feedthrough noise.

17. A method for reducing a tape read head temperature, the method comprising:
   presenting a first amplitude bias signal to a tape read head during at least a first mode of operation; and
   presenting a second amplitude bias signal to the read head during at least a second mode of operation, wherein the second amplitude is lower than the first amplitude, wherein the amplitude of the first bias signal is selected to lessen noise impact on a read signal during a write/read operation.

18. The method of claim 17 wherein the read head comprises a magnetoresistive (MR) read head.

19. The method of claim 17 wherein the first mode comprises a mode of operation other than a read only mode.

20. The method of claim 17 wherein the first mode comprises a write/read mode.

21. The method of claim 17 wherein the second mode comprises at least one read only mode of operation.

22. The method of claim 21 wherein the read only mode of operation comprises an earlier generation drive read only mode.

23. The method of claim 21 wherein the read only mode of operation comprises a normal, current generation drive read only mode.

24. The method of claim 21 wherein the read only mode of operation comprises an error recovery read only mode.

25. The method of claim 17 wherein the first and second bias signals comprise current signals.

26. The method of claim 17 the method further comprising reducing block error rates.

27. The method of claim 17 the method further comprising increasing lifespan of the read head.

28. The method of claim 17 the method further comprising selecting the first amplitude to lessen impact of write-to-read feedthrough noise.

29. The method of claim 17 wherein the second amplitude is in a range of 70% to 90% of the first amplitude.

30. The method of claim 17 wherein the second amplitude is in a range of 75% to 85% of the first amplitude.

31. The method of claim 17 wherein the second amplitude is approximately 80% of the first amplitude.

32. An apparatus comprising:

a tape read head; and a tape read head bias signal control circuit configured to present a first amplitude bias signal in response to at least a first control signal and a second amplitude bias signal in response to at least a second control signal to the tape read head, wherein the second amplitude is lower than the first amplitude, and the amplitude of the first bias signal is selected to lessen noise impact on a read signal during a write/read operation.

33. A method for reducing a tape read head temperature, the method comprising:

providing a tape read head bias signal control circuit configured to present to a tape read head a first amplitude bias signal in response to at least a first control signal and a second amplitude bias signal in response to at least a second control signal, wherein the second amplitude is lower than the first amplitude, and the amplitude of the first bias signal is selected to lessen noise impact on a read signal during a write/read operation.

* * * * *